United States Patent
Beaunoir et al.

(10) Patent No.: US 7,926,075 B2
(45) Date of Patent: Apr. 12, 2011

(54) APPLICATION BLOCKING SYSTEM

(75) Inventors: Nicolas Beaunoir, Paris (FR);
Jean-Philippe Lenoir, Houilles (FR)

(73) Assignee: NDS Limited, Staines, Middlesex (GB)

( * ) Notice: Subject to any disclaimer, the term of this patent is extended or adjusted under 35 U.S.C. 154(b) by 578 days.

(21) Appl. No.: 11/795,214

(22) PCT Filed: Nov. 3, 2005

(86) PCT No.: PCT/GB2005/004252
§ 371 (c)(1),
(2), (4) Date: Jul. 13, 2007

(87) PCT Pub. No.: WO2007/051956
PCT Pub. Date: May 10, 2007

(65) Prior Publication Data
US 2008/0216108 A1   Sep. 4, 2008

(51) Int. Cl.
*H04N 7/16* (2011.01)
(52) U.S. Cl. ......................................... 725/25
(58) Field of Classification Search .................. None
See application file for complete search history.

(56) References Cited

U.S. PATENT DOCUMENTS

| | | | | |
|---|---|---|---|---|
| 5,973,683 A | * | 10/1999 | Cragun et al. | 715/719 |
| 6,675,384 B1 | * | 1/2004 | Block et al. | 725/28 |
| 2003/0217369 A1 | * | 11/2003 | Heredia | 725/152 |
| 2004/0237098 A1 | | 11/2004 | Watson et al. | |

FOREIGN PATENT DOCUMENTS

| | | | |
|---|---|---|---|
| EP | 0 905 928 A1 | | 3/1999 |
| EP | 0 989 743 A1 | | 3/2000 |
| EP | 0989743 A1 | * | 3/2000 |
| EP | 1 251 688 A1 | | 10/2002 |
| WO | WO 01/31920 A1 | | 5/2001 |
| WO | WO 03/098895 A1 | | 11/2003 |
| WO | WO 2004/032485 A1 | | 4/2004 |

OTHER PUBLICATIONS

Steven Morris, "The Lifecycle of an MHP Application" (2004), from the Interactive TV Web.
R. Sedlmeyer, "Multimedia Home Platform—Standard 1.0.1" *Fernseh und Kino-Technik*, vol. 55, No. 10, p. 593-603 (2001) with English language version of same article.

* cited by examiner

*Primary Examiner* — Brian T Pendleton
*Assistant Examiner* — Cai Chen
(74) *Attorney, Agent, or Firm* — Husch Blackwell LLP

(57) ABSTRACT

A set-top box system for blocking signaled applications from being run on a set-top box, the system comprising an audio/video service receiving module to receive at least one audio/video service, an application receiving module to receive an application, an application signaling module to manage a first table including signaling information indicating that the application is a signaled application authorized for being run on the set-top box, and an application blocking module to receive a second table including blocking information to block running of the signaled application on the set-top box, the second table being received from a broadcasting Head-end, and block running of the signaled application on the set-top box in response to receiving the second table. Related apparatus and methods are also described.

18 Claims, 7 Drawing Sheets

APPLICATION BLOCKING SYSTEM

The present application is a 35 USC §371 application of PCT/GB2005/004252, filed on 3 Nov. 2005 and entitled "Application Blocking System", which was published on 10 May 2007 in the English language with International Publication Number WO 2007/051956 A1.

FIELD OF THE INVENTION

The present invention relates to blocking applications in a broadcasting environment, and in particular, relates to blocking a signaled application in a broadcasting environment.

BACKGROUND OF THE INVENTION

By way of introduction, in a broadcast TV environment (for example, but not limited to satellite, cable, digital terrestrial television (DTT) and digital subscriber line (DSL)), applications, such as interactive TV applications, are typically signaled for running on a set-top box, also known as an integrated receiver decoder. The signaling is typically performed via a table such as an application information table (AIT) in a DVB-MHP environment or any other suitable private signaling or standardized signaling mechanism. The table is typically monitored by regularly checking the table changes in the broadcast stream or the table is cached periodically. If the applications do not have signaling, the applications generally cannot run on the set-top box. When the application signaling is cached, the signaling cannot be changed until the next caching operation of the table.

The following references are believed to represent the state of the art:

US Published Patent Application No. 2004/0237098 of Watson, et al.;

European Published Patent Application No. EP0905928 of Sony Corporation; and

European Published Patent Application No. EP1251688 of CANAL+S.A.

The disclosures of all references mentioned above and throughout the present specification, as well as the disclosures of all references mentioned in those references, are hereby incorporated herein by reference.

SUMMARY OF THE INVENTION

The present invention seeks to provide a system/method for blocking applications in a broadcasting environment, and in particular, blocking a signaled application in a broadcasting environment.

The system of the present invention, in preferred embodiments thereof, blocks signaled applications from running on a set-top box (STB).

The blocking function is typically performed by broadcasting an application blocking table (ABT) from the Headend to the STBs. The ABT is received by the STBs. The ABT preferably includes a list of applications to be blocked as well as conditions relating to what extent the applications should be blocked, for example, for what service(s) and for what time period(s). Signaled applications are blocked from being run on the STB in accordance with the ABT whatever the signaling. In other words, the ABT blocking overrides the application signaling.

Additionally or alternatively, applications are preferably blocked which fulfill one or more parental control rules as defined by a user of the STB.

Blocking may dependent on the type of STB hardware and/or the type of STB software and/or the producer of the applications.

Application blocking allows an operator to block individual signaled applications for example, but not limited to: applications that have become corrupted after broadcasting the application signaling (for example, the AIT or any suitable private application signaling); and/or applications of another operator also signaled by the other operator.

Additionally, application blocking also typically allows an operator to validate applications in a real environment. For example, when a new application is broadcast, the operator can signal the application for running on the STBs and at the same time block running of the applications on all STBs by broadcasting an ABT to the STBs. The operator then preferably removes blocking of the application on a testing STB in order to test the application. The removal of the blocking system is typically via a hidden or non-hidden STB menu. Once the application has been validated, the operator preferably removes blocking of the validated application by broadcasting a new ABT. A new ABT generally overrides an old cached ABT.

There is thus provided in accordance with a preferred embodiment of the present invention a set-top box system for blocking signaled applications from being run on a set-top box, the system including an audio/video service receiving module to receive at least one audio/video service, an application receiving module to receive an application, an application signaling module to manage a first table including signaling information indicating that the application is a signaled application authorized for being run on the set-top box, and an application blocking module to receive a second table including blocking information to block running of the signaled application on the set-top box, the second table being received from a broadcasting Headend, and block running of the signaled application on the set-top box in response to receiving the second table.

Further in accordance with a preferred embodiment of the present invention the application receiving module is operative to receive the application from the broadcasting Headend.

Still further in accordance with a preferred embodiment of the present invention the application receiving module is operative to receive the application from another broadcasting Headend.

Additionally in accordance with a preferred embodiment of the present invention the application blocking module is operative to block running of the application on the set-top box for a predetermined service.

Moreover in accordance with a preferred embodiment of the present invention the application blocking module is operative to block running of the application on the set-top box for a predetermined day.

Further in accordance with a preferred embodiment of the present invention the application blocking module is operative to block running of the application on the set-top box for a predetermined time period.

Still further in accordance with a preferred embodiment of the present invention the application blocking module is operative to select the signaled application for blocking based on at least one of hardware and software of the set-top box.

Additionally in accordance with a preferred embodiment of the present invention the application blocking module is operative to select the signaled application for blocking based on a producer of the signaled application.

Moreover in accordance with a preferred embodiment of the present invention the application includes an interactive television application.

There is also provided in accordance with still another preferred embodiment of the present invention a Headend system for blocking a signaled application from being run on a set-top box, the system including an audio/video service sending module to send at least one audio/video service to the set-top box, an application sending module to send an application to the set-top box, an application signaling module to send a first table including signaling information for the application to the set-top box, the signaling information indicating that the application is a signaled application authorized for being run on the set-top box, and an application blocking module to send a second table including blocking information to the set-top box, the blocking information being to block running of the signaled application on the set-top box.

Further in accordance with a preferred embodiment of the present invention the application blocking module is operative to block running of the signaled application on the set-top box for a predetermined service.

Still further in accordance with a preferred embodiment of the present invention the application blocking module is operative to block running of the signaled application on the set-top box for a predetermined day.

Additionally in accordance with a preferred embodiment of the present invention the application blocking module is operative to block running of the signaled application on the set-top box for a predetermined time period.

Moreover in accordance with a preferred embodiment of the present invention the application blocking module is operative to block running of the signaled application based on at least one of hardware and software of the set-top box.

Further in accordance with a preferred embodiment of the present invention the application blocking module is operative to block running of the signaled application based on a producer of the signaled application.

Still further in accordance with a preferred embodiment of the present invention the application includes an interactive television application.

There is also provided in accordance with still another preferred embodiment of the present invention a method for blocking signaled applications from being run on a set-top box, the method including receiving at least one audio/video service, receiving an application, managing a first table including signaling information indicating that the application is a signaled application authorized for being run on the set-top box, receiving a second table including blocking information to block running of the signaled application on the set-top box, the second table being received from a broadcasting Headend, and blocking running of the signaled application on the set-top box in response to receiving the second table.

There is also provided in accordance with still another preferred embodiment of the present invention a method for blocking a signaled application from being run on a set-top box from a Headend, the method including sending at least one audio/video service to the set-top box, sending an application to the set-top box, sending a first table including signaling information for the application to the set-top box, the signaling information indicating that the application is a signaled application authorized for being run on the set-top box, and sending a second table including blocking information to the set-top box, the blocking information being for blocking running of the signaled application on the set-top box.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
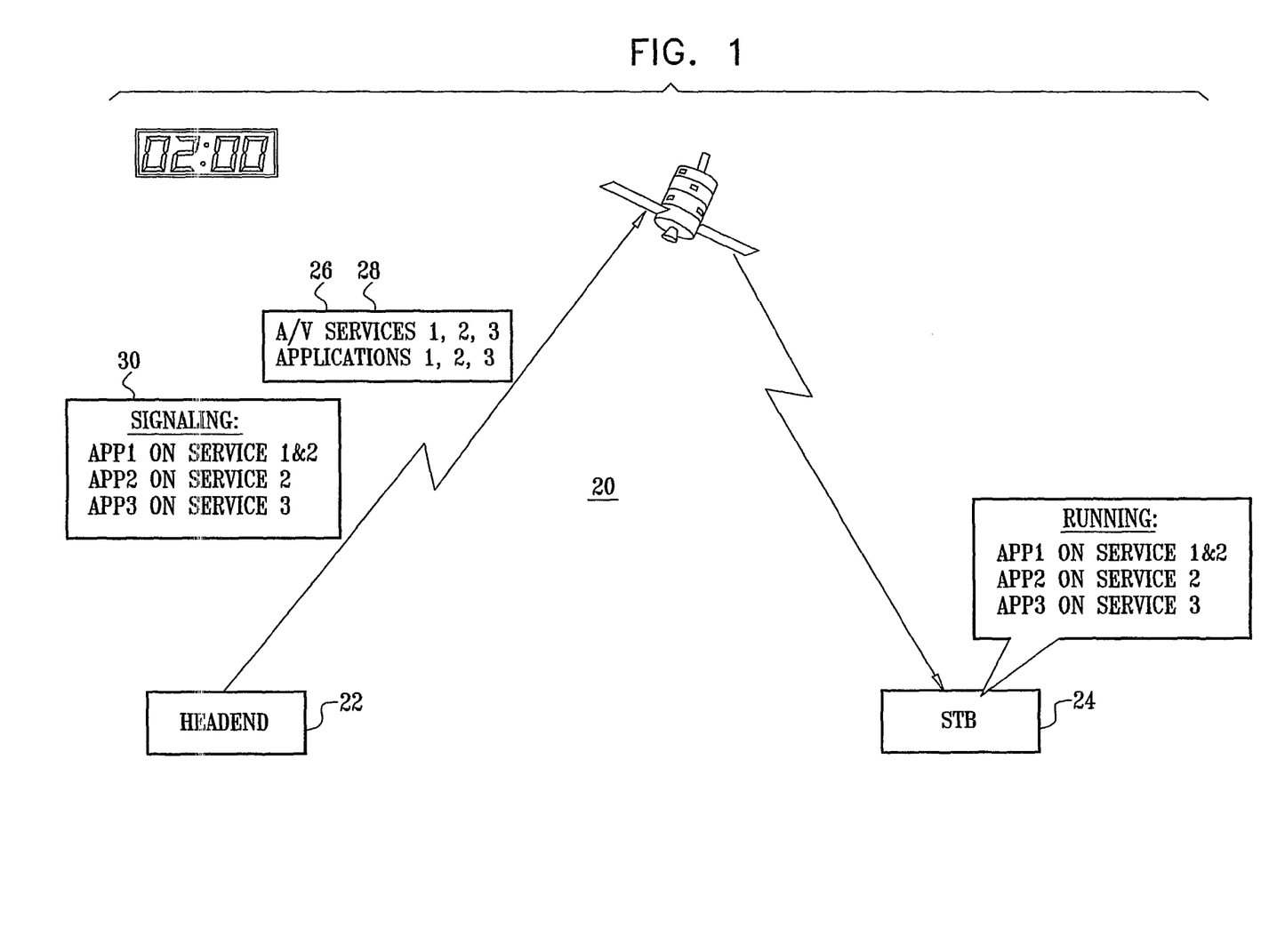
FIG. 1 is a partly pictorial, partly block diagram view of a broadcasting system constructed and operative in accordance with a preferred embodiment of the present invention.

Reference is now made to FIG. 1, which is a partly pictorial, partly block diagram view of a broadcasting system 20 constructed and operative in accordance with a preferred embodiment of the present invention. The broadcasting system 20 preferably includes a Headend 22 and a plurality of set-top boxes (STBs) 24 (only one STB is shown for clarity). The Headend 22 preferably broadcasts a plurality of services 26 and applications 28 to the STBs 24. In the example of FIG. 1, the services 26 include services 1, 2 and 3, and the applications 28 include applications 1, 2 and 3. The term "service" as used in the specification and claims is defined as a sequence of events under the control of a broadcaster; the events can be broadcast as part of a schedule. The broadcasting system 20 of FIG. 1 has been shown as a satellite system. However, it will be appreciated by those ordinarily skilled in the art that the broadcasting system 20 may be a cable, digital terrestrial television (DTT), digital subscriber line (DSL)) or any other suitable broadcasting system.

The applications are typically interactive television applications. Interactive television applications are typically applications which run on the STB 24 providing interaction between the viewer/user and the STB 24. Interactive television applications are generally used for a variety of applications, for example, but not limited to shopping, e-mail, gaming, video-on-demand, access to local community information, live voting, and electronic programming guides.

The Headend 22 also generally broadcasts signaling information 30 to the STBs 24, typically in the form of a table, for example, but not limited to, an application information table in a DVB-MHP environment. The signaling information 30 is typically sent substantially continuously from the Headend 22 to the STBs 24. The STBs 24 typically either cache or monitor the signaling information 30 depending on the software of the STBs 24. In the example of FIG. 1, which is non-limiting the signaling information 30 is cached at 2 am each morning. The signaling information 30 has signaled the application 1 for running in association with the service 1 and 2 only, the application 2 with the service 2 only and the application 3 with the service 3 only. The application manager module (not shown) of each STB 24, runs the applications 1, 2 and 3 in accordance with the signaling information 30 which is received. Therefore, the application 1 runs in association with the service 1 and 2 only, the application 2 with the service 2 only and the application 3 with the service 3 only.

Figure 2:
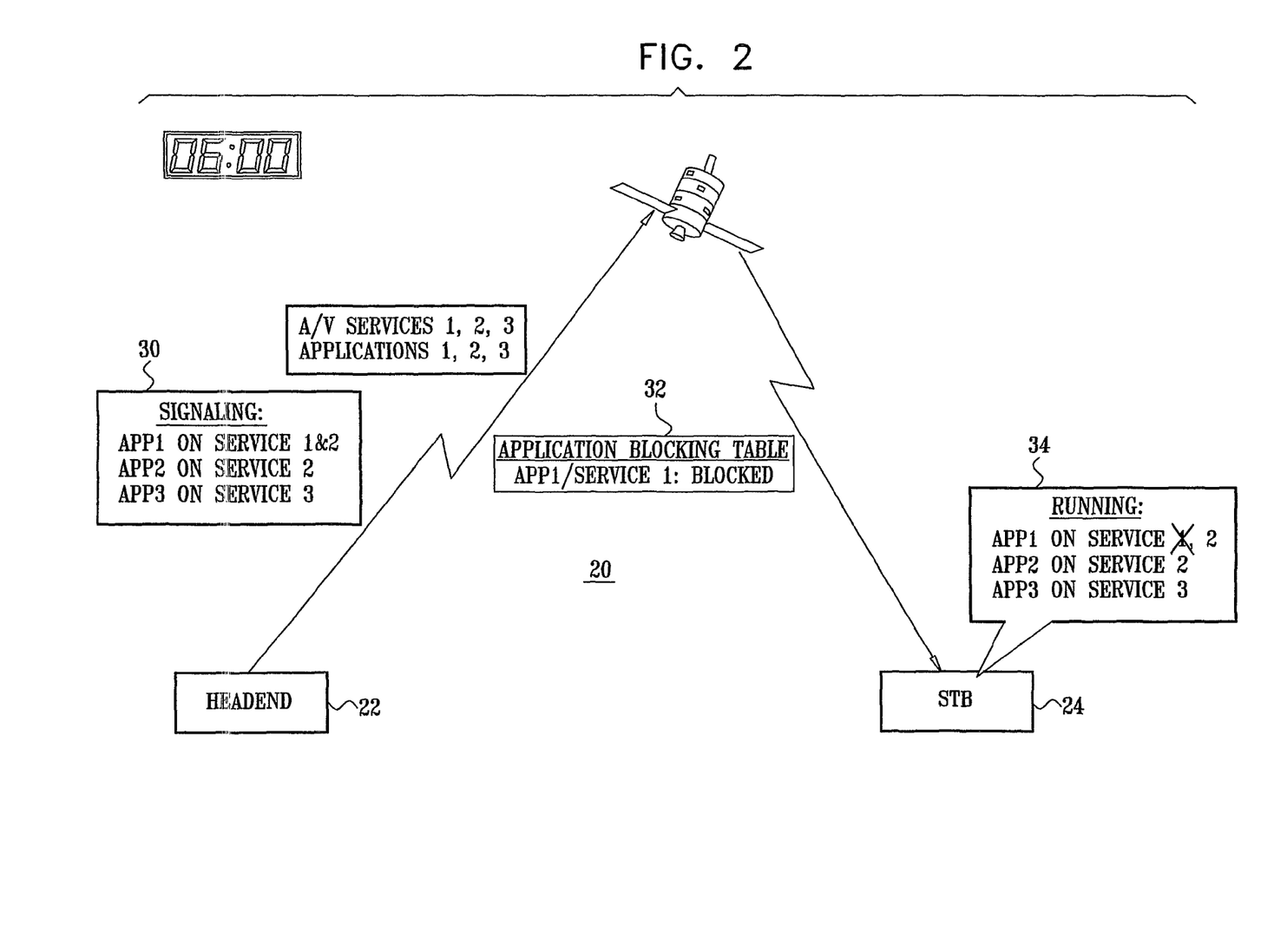
FIG. 2 is a partly pictorial, partly block diagram view of the broadcasting system of FIG. 1 after a first application blocking table is broadcast.

Reference is now made to FIG. 2, which is a partly pictorial, partly block diagram view of the broadcasting system 20 of FIG. 1 after a first application blocking table 32 is broadcast. At 6 am the same day, the broadcaster discovered that the application 1 is not suitable for running with the service 1. Instead of broadcasting a new table for the signaling information 30, the application blocking table 32 is broadcast by the Headend 22 to the STBs 24. The application manager module (not shown) of the STBs 24 blocks running of the application 1 on the service 1 (block 34). Therefore, the only application running on the service 1 is the application 2.

Figure 3:
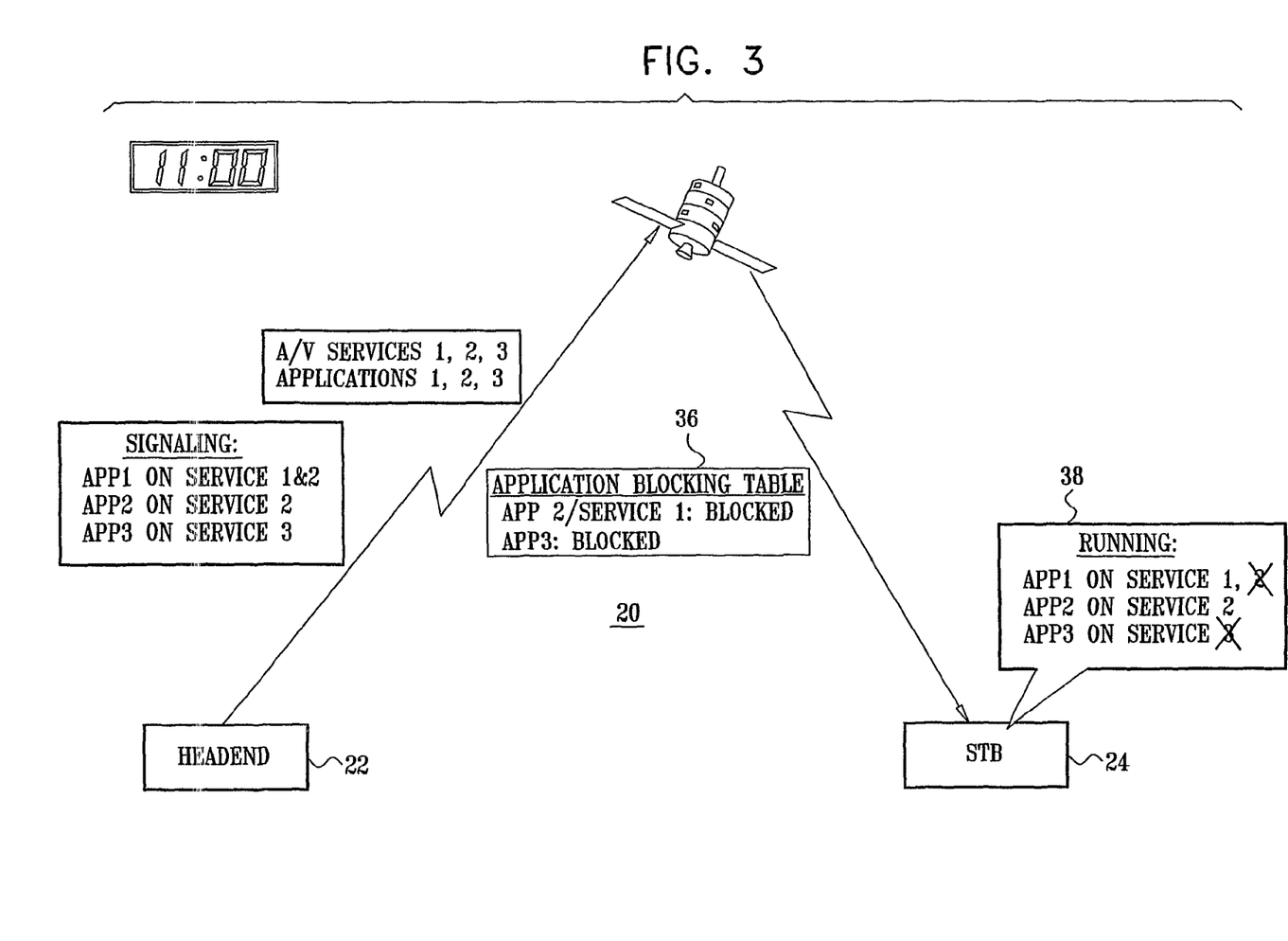
FIG. 3 is a partly pictorial, partly block diagram view of the broadcasting system of FIG. 1 after a second application blocking table is broadcast.

Reference is now made to FIG. 3, which is a partly pictorial, partly block diagram view of the broadcasting system 20 of FIG. 1 after a second application blocking table 36 is broadcast. At 11 am the same day, the application 1 has been fixed and is now suitable for running on the service 1. However, a problem has been detected with the application 2 with the service 2 as well as the application 3 due to a bug being detected. Therefore, the Headend 22 broadcasts the application blocking table 36, which blocks the application 2 from running with the service 1 and the application 3 from running on any service. However, the application 2 can still run on the service 2. Additionally, the previous blocking of the application 1 on the service 1 has now been removed as the application blocking table 32 (FIG. 2) has been replaced by the newly broadcast application blocking table 36. Therefore, the STBs 24 are able to run the application 1 on the service 1 and the application 2 on the service 2 (block 38).

Figure 4:
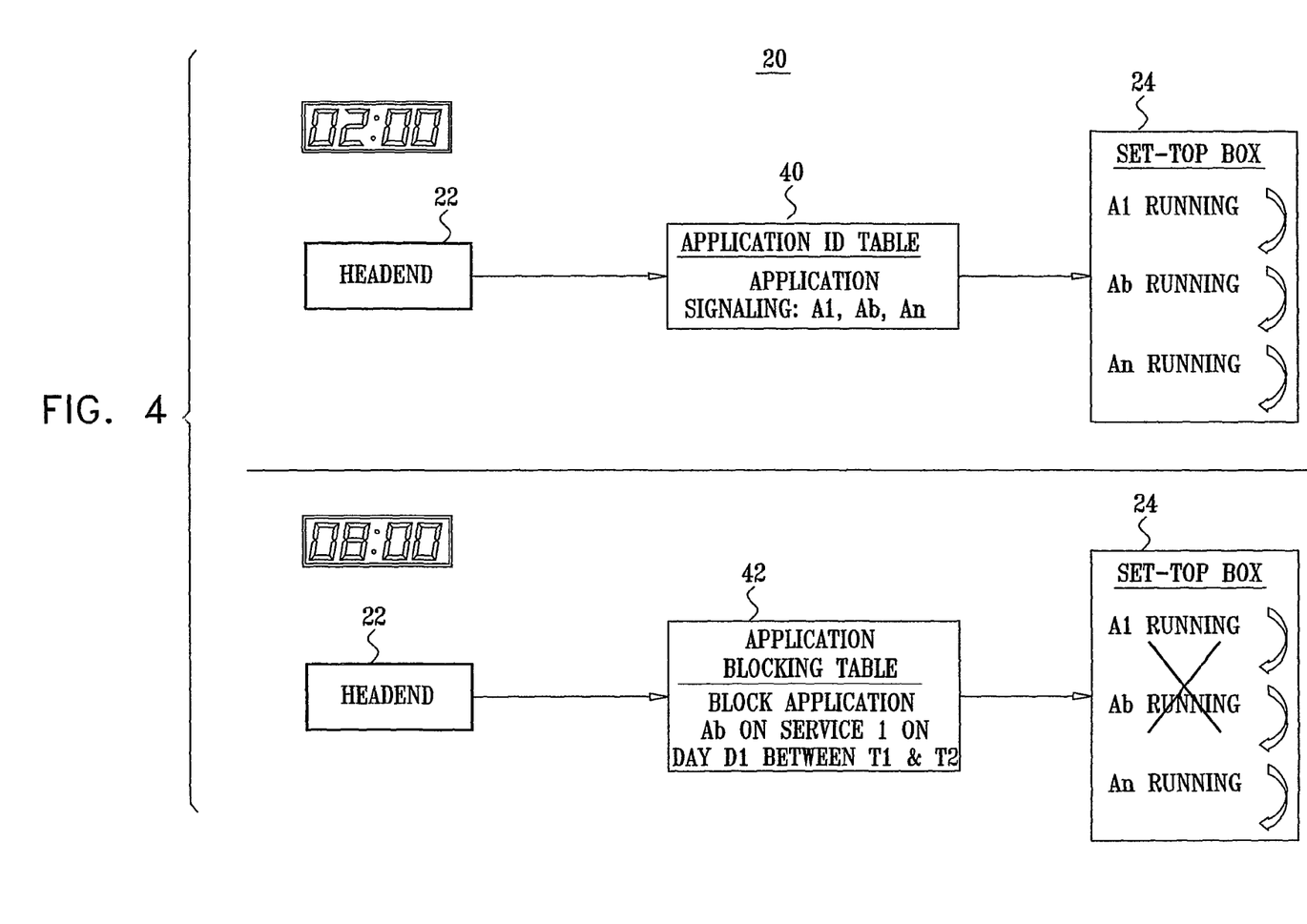
FIG. 4 is a partly pictorial, partly block diagram view of the broadcasting system of FIG. 1 after a new application information table and a new application blocking table are broadcast.

Reference is now made to FIG. 4, which is a partly pictorial, partly block diagram view of the broadcasting system 20 of FIG. 1 after a new application information table 40 and a new application blocking table 42 are broadcast. At 2 am the next day, the application information table 40 is broadcast by the Headend 22 to the STBs 24. The application information table 40 includes signaling for applications A1, Ab and An. For simplicity, it is assumed that the applications A1, Ab and An, are for running with all services. The STB 24 is shown running the applications A1, Ab and An.

At 8 am the same day, the broadcaster decides that the application Ab should not run on day D1 between times T1 and T2. Therefore, the Headend 22 broadcasts the application blocking table 42 to the STBs 24. Therefore, the application Ab is blocked from running on the STBs 24 on day D1 between times T1 and T2.

Figure 5:
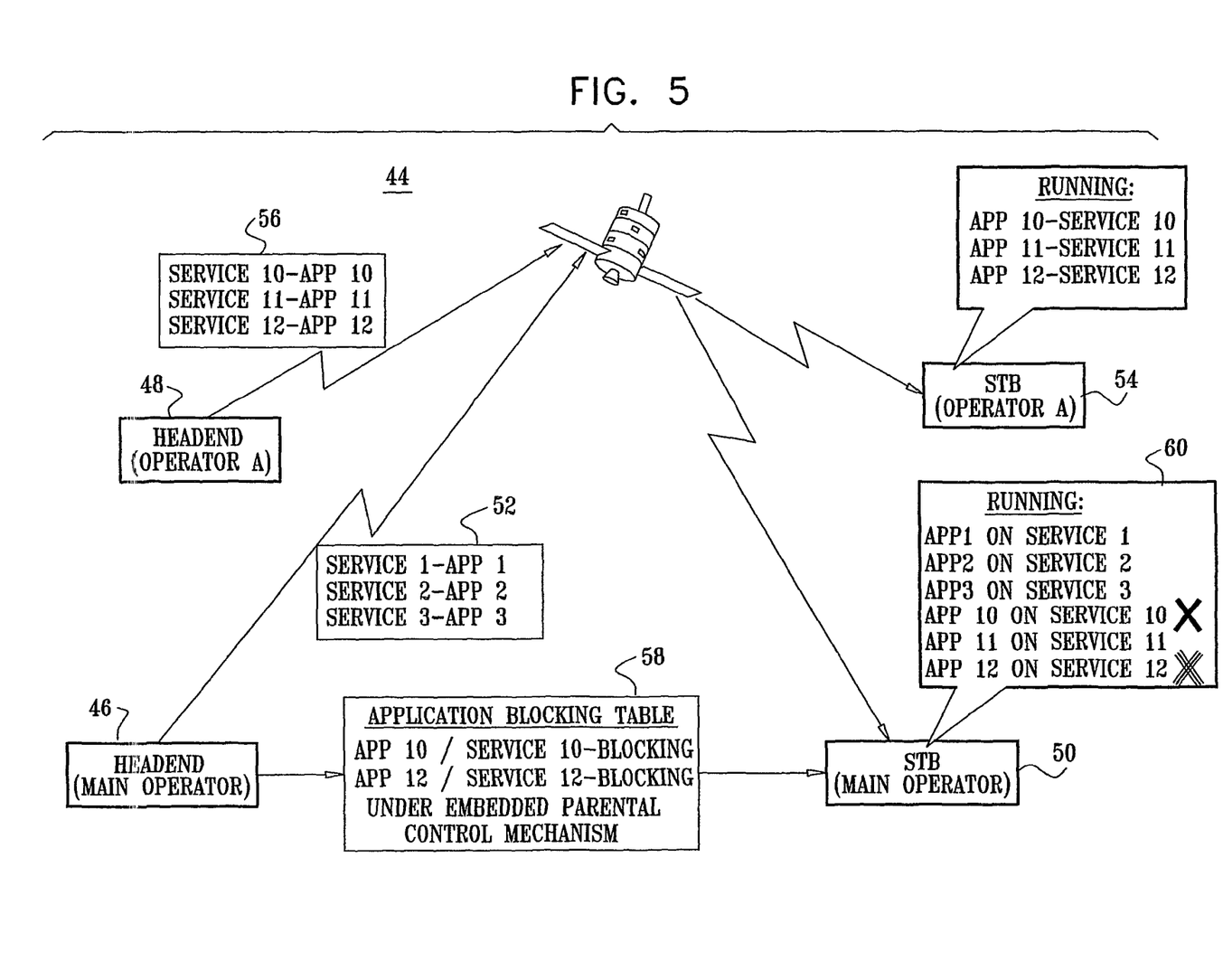
FIG. 5 is a partly pictorial, partly block diagram view of a broadcasting system including a main operator and a contributory operator constructed and operative in accordance with the preferred embodiment of the present invention.

Reference is now made to FIG. 5, which is a partly pictorial, partly block diagram view of a broadcasting system 44 including a main operator Headend 46 and a contributory operator Headend 48 (Operator A) constructed and operative in accordance with the preferred embodiment of the present invention.

The main operator Headend 46 broadcasts services 1, 2 and 3 as well as applications 1, 2 and 3 to a plurality of main operator STBs 50 (only one shown for clarity). Additionally, the main operator Headend 46 broadcasts a signaling table 52 to the main operator STBs 50. The signaling table 52 signals the application 1 to run with the service 1 only, the application 2 to run with the service 2 only, and the application 3 to run with the service 3 only.

The contributory operator Headend 48 broadcasts the services 10, 11 and 12, as well as the applications 10, 11 and 12 to the main operator STBs 50 and to a plurality of contributory STBs 54 (associated with the contributory operator Headend 48). Only one contributory STB 54 is shown for clarity. Additionally, the contributory operator Headend 48 broadcasts a signaling table 56 to the main operator STBs 50 and to the contributory STBs 54. The signaling table 56 signals the application 10 to run with the service 10 only, the application 11 with the service 11 only and the application 12 with the service 12 only.

The main operator Headend 46 does not typically have any direct control over which applications and services are broadcast by the contributory operator Headend 48. Additionally, the main operator Headend 46 does not typically have any control over the content of the signaling table 56 broadcast by the contributory operator Headend 48.

The broadcaster (not shown) associated with the main operator Headend 46 for commercial/technical reasons does not want to run the application 10 on the main operator STBs 50. Additionally, the broadcaster associated with the main operator Headend 46 wants the application 12 to run with the service 12 on the main operator STBs 50 only in accordance with the parental control mechanism embedded on the main operator STBs 50. Therefore, the main operator Headend 46 broadcasts an application blocking table 58 to the main operator STBs 50. The application blocking table 58 blocks the application 10 from running on the main operator STBs 50 as well as only allowing running of the application 12 in accordance with a parental control mechanism (not shown) embedded in the main operator STBs 50. The parental control mechanism is described in more detail with reference to FIGS. 8 and 9. For example, if the application 12 has an associated suitable usage age of 14 years and the STB 50 has been programmed for parental approval of any application above 10 years of age, then the application 12 cannot be run on the STB 50 without parental approval.

The results of the signaling of the signaling table 52 and the signaling table 56 as well as the application blocking table 58 are shown in block 60, wherein the application 10 is blocked unconditionally and the application 12 is blocked in accordance with the parental control mechanism.

Figure 6:
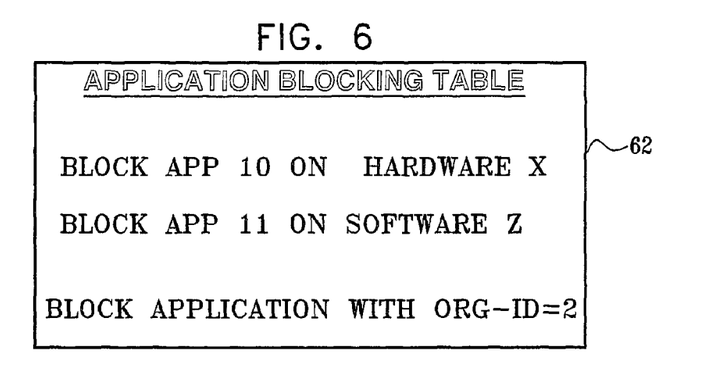
FIG. 6 is a simplified view of an application blocking table for use with the system of FIG. 5.

Reference is now made to FIG. 6, which is a simplified view of an application blocking table 62 for use with the broadcasting system 44 of FIG. 5. Application blocking may be targeted based on any suitable criteria, for example, but not limited to, STB hardware, STB software and/or based on a producer of a signaled application. By way of example only, in a DVB-MHP environment, a producer of an application is represented by the organization ID (Org_Id) so that blocking can be performed in accordance with Org-Id.

The application blocking table 62 shows that the application 10 is blocked on hardware X, the application 11 is blocked with software Z and all of the applications having Org-Id=2 are blocked.

Figure 7:
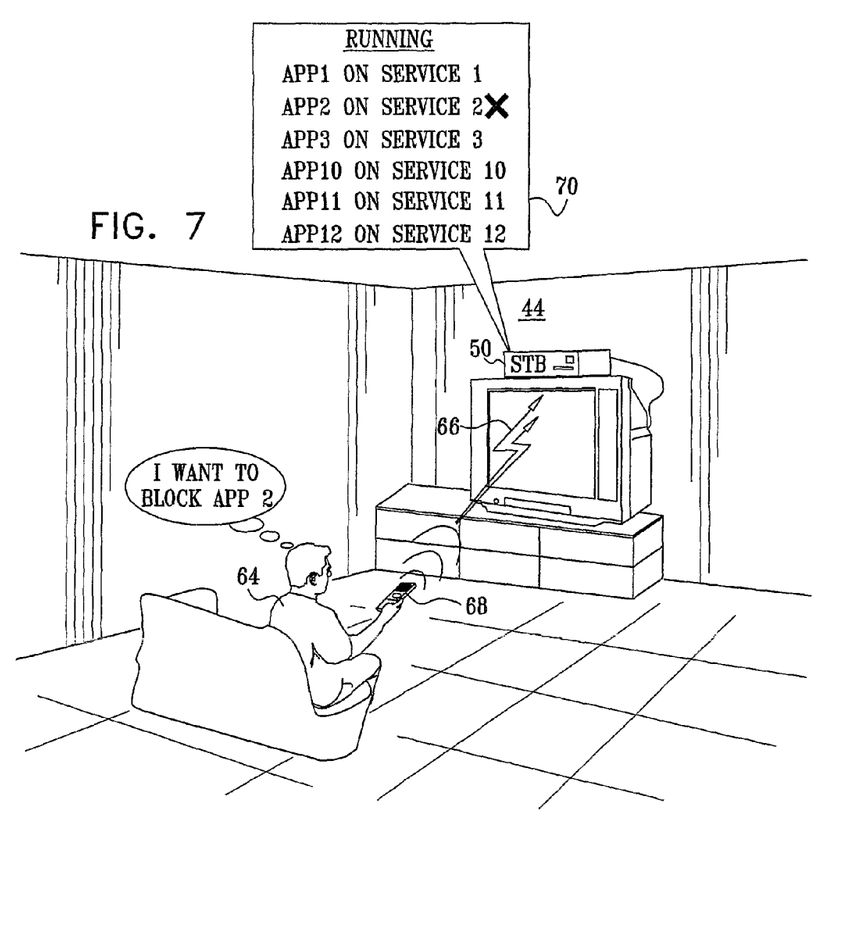
FIG. 7 is a partly pictorial, partly block diagram view of part of the broadcasting system of FIG. 5 showing manual application blocking.

Reference is now made to FIG. 7, which is a partly pictorial, partly block diagram view of part of the broadcasting system 44 of FIG. 5 showing manual application blocking. In accordance with a most preferred embodiment of the present invention, blocking of application(s) may be performed manually based on a manual instruction 66 from a user 64 of the STB 50. FIG. 7 shows that the user 64 issuing the manual instruction 66 via a remote control 68 to the STB 50 in order to block the application 2. The result of the manual instruction 66 is shown in block 70.

Figure 8:
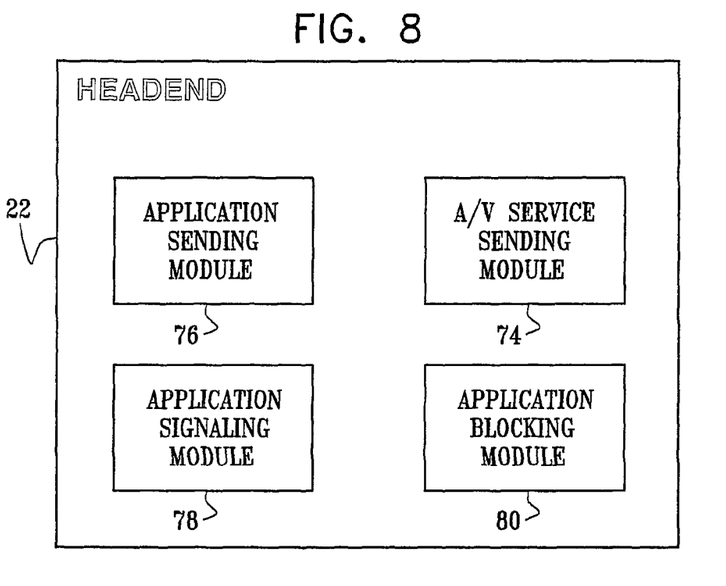
FIG. 8 is a block diagram view of a Headend for use with the broadcasting system of FIG. 1.

Reference is now made to FIG. 8, which is a block diagram view of the Headend 22 of the broadcasting system 20 of FIG. 1. Reference is also made to FIG. 1. The Headend 22 is operative to block one or more of the signaled applications 28 from being run on the STBs 24 (FIG. 1). The Headend 22 preferably includes an audio/video service sending module 74, an application sending module 76, an application signaling module 78, an application blocking module 80 as well as other elements required for a Headend known to those ordinarily skilled in the art.

The audio/video service sending module 74 is preferably operative to send the audio/video services 26 to the STBs 24. The application sending module 76 is typically operative to send the applications 28 to the STBs 24. The applications 28 typically include interactive television applications. The application signaling module 78 is generally operative to send a table including signaling information 30 for one or more of the applications 28 to the STBs 24. The signaling information 30 preferably indicates which of the applications 28 are signaled applications authorized for being run on the STBs 24.

The application blocking module 80 is typically operative to send blocking information in a table, for example, but not limited to, the application blocking table 32, to the STBs 24. The blocking information is preferably for blocking running of selected ones of the signaled applications 28 on the STBs 24. It should be noted that specific application(s) can be listed for blocking in the blocking information. However, the blocking information may specify general blocking conditions or rules for blocking applications; for example, the blocking may be based on one or more of the following: STB hardware, STB software, parental control rules resident on the individual STBs and/or a producer of the individual signaled applications 28.

The application blocking module 80 may block running of the selected applications 28 on the set-top box for a predetermined service and/or for a predetermined day and/or for a predetermined time period by coding the blocking information accordingly.

Figure 9:
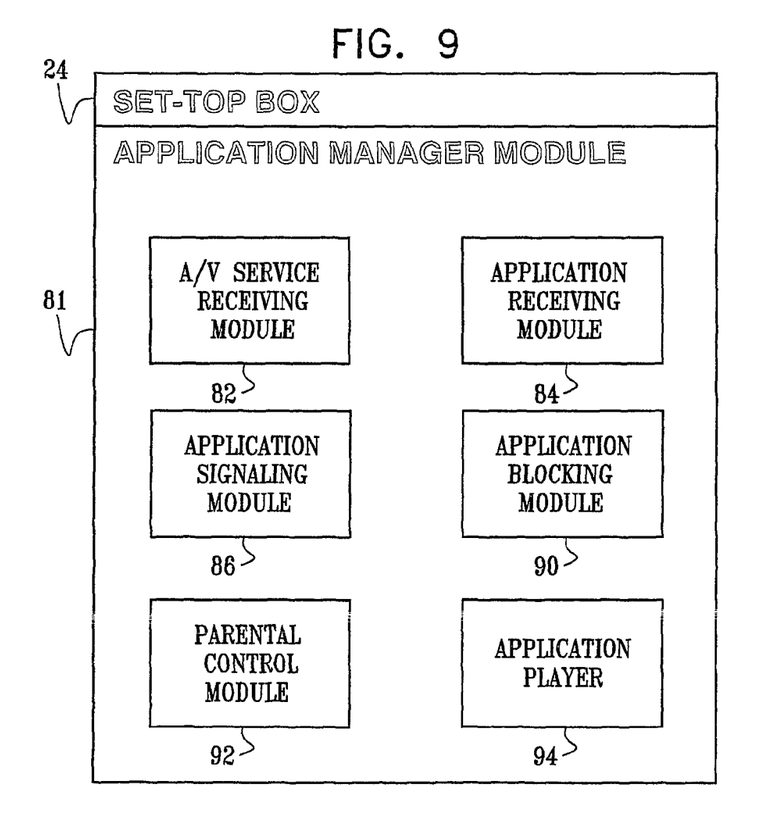
FIG. 9 is a block diagram view of a set-top box for use with the broadcasting system of FIG. 1.

Reference is now made to FIG. 9, which is a block diagram view of the STB 24 of the broadcasting system 20 of FIG. 1. Reference is also made to FIG. 1. The STB 24 preferably includes an application manager module 81 which typically has an audio/video service receiving module 82, an application receiving module 84, an application signaling module 86, an application blocking module 90, a parental control module 92 and an application player 94 for running the applications 28. The STB 24 also typically includes other STB elements as known to those ordinarily skilled in the art.

The audio/video service receiving module 82 is preferably operative to receive the audio/video services 26. The application receiving module 84 is typically operative to receive the applications 28 from the broadcasting Headend 22 or from another broadcasting Headend (for example the contributory operator Headend 48 of FIG. 5).

The application signaling module 86 is generally operative to receive and manage the table including the signaling information 30 indicating that one or more of the applications 28 are signaled applications authorized for being run on the STB 24. The signaling information 30 is cached periodically and possibly monitored substantially continuously for real-time updates to the table. It should be noted that when the signaling information 30 is substantially continuously monitored, the use of application blocking is still beneficial, for example, but not limited to, when the signaling information 30 is controlled by another operator or when it is necessary to block applications meeting certain criteria, such as, STB hardware, STB software, and/or parental control rules resident on the individual STBs.

The application blocking module 90 is preferably operative to receive blocking information in a table, such as, the application blocking table 32 (FIG. 2) from the broadcasting Headend 22. The blocking information is typically used by the application blocking module 90 in order to block running of selected ones of the signaled applications 28 on the STB 24 in response to receiving the table including the blocking information. In other words, the blocking information preferably overrides the application signaling information 30 so that the applications 28 which should be blocked in accordance with the blocking information are blocked whatever the application signaling information 30.

As described above with reference to FIG. 8, it should be noted that specific application(s) 28 may be targeted for blocking in the blocking information. However, the blocking information may specify general blocking conditions or rules for blocking applications, for example, the blocking by the application blocking module 90 may be based on one or more of the following: STB hardware, STB software, parental control rules resident on the individual STBs and/or a producer of the individual signaled applications 28. So for example, an application 28 may be blocked on one set-top box while allowed to run on another set-top box. Additionally, a whole class of applications by a particular producer may be blocked on all STBs or only on some STBs.

The parental control module 92 preferably manages one or more parent control rules. If the blocking information states that one or more of the signaled applications 28 must be blocked in accordance with the embedded parental control mechanism, the application blocking module 90 typically compares the parental rating of the selected application(s) 28 with the parental control rule(s) of the parental control module 92 and decides whether to block the application 28. If the application blocking module 90 decides to block an application 28 in accordance with the parental control rule(s), then typically an on-screen display (not shown) is displayed on a television screen associated with the STB 24 allowing a parent to override the blocking using a password, for example.

In accordance with the blocking information, the application blocking module 90 may block running of selected ones of the applications 28 on the set-top box for a predetermined service and/or for a predetermined day and/or for a predetermined time period.

Alternatively or additionally, the application blocking module 90 may block applications 28 based on a manual instruction from a user of the STB 24 to block specified applications 28, groups of applications 28 or applications 28 fitting certain criteria, for example, but not limited to, a non-favored producer of applications.

It is appreciated that software components of the present invention may, if desired, be implemented in ROM (read only memory) form. The software components may, generally, be implemented in hardware, if desired, using conventional techniques.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove. Rather the scope of the invention is defined only by the claims which follow.

The invention claimed is:

1. A set-top box system for blocking signaled applications from being run on a set-top box, the system comprising:
   physical computing machinery:
   (a) to receive at least one audio/video service;
   (b) to receive an application;
   (c) to manage a first table including signaling information indicating that the application is a signaled application authorized for being run on the set-top box;
   (d) to receive a second table including blocking information to block running of the signaled application on the set-top box, the second table being received from a broadcasting Headend;
   (e) to block running of the signaled application on the set-top box in response to receiving the second table; and
   (f) to receive a third table not including the blocking information blocking running of the signaled application on the set-top box, the third table being received from the broadcasting Headend, the third table overriding the second table so that the hardware is operative to remove the blocking of the running of the signaled application on the set-top box.

2. The system according to claim 1, wherein the physical computing machinery is operative to receive the application from the broadcasting Headend.

3. The system according to claim 1, wherein the physical computing machinery is operative to receive the application from another broadcasting Headend.

4. The system according to claim 1, wherein the physical computing machinery is operative to block running of the application on the set-top box for a predetermined service.

5. The system according to claim 1, wherein the physical computing machinery is operative to block running of the application on the set-top box for a predetermined day.

6. The system according to claim 1, wherein the physical computing machinery is operative to block running of the application on the set-top box for a predetermined time period.

7. The system according to claim 1, wherein the physical computing machinery is operative to select the signaled application for blocking based on at least one of hardware and software of the set-top box.

8. The system according to claim 1, wherein the physical computing machinery is operative to select the signaled application for blocking based on a producer of the signaled application.

9. The system according to claim 1, wherein the application includes an interactive television application.

10. A Headend system for blocking a signaled application from being run on a set-top box, the system comprising:
    physical computing machinery:
    (a) to send at least one audio/video service to the set-top box;
    (b) to send an application to the set-top box;
    (c) to send a first table including signaling information for the application to the set-top box, the signaling information indicating that the application is a signaled application authorized for being run on the set-top box;
    (d) to send a second table including blocking information to the set-top box, the blocking information being to block running of the signaled application on the set-top box; and
    (e) to send a third table not including the blocking information blocking running of the signaled application on the set-top box, the third table overriding the second table so that the blocking of the running of the signaled application is removed on the set-top box.

11. The system according to claim 10, wherein the physical computing machinery is operative to block running of the signaled application on the set-top box for a predetermined service.

12. The system according to claim 10, wherein the physical computing machinery is operative to block running of the signaled application on the set-top box for a predetermined day.

13. The system according to claim 10, wherein the physical computing machinery is operative to block running of the signaled application on the set-top box for a predetermined time period.

14. The system according to claim 10, wherein the physical computing machinery is operative to block running of the signaled application based on at least one of hardware and software of the set-top box.

15. The system according to claim 10, wherein the physical computing machinery is operative to block running of the signaled application based on a producer of the signaled application.

16. The system according to claim 10, wherein the application includes an interactive television application.

17. A method for blocking signaled applications from being run on a set-top box, the method comprising:
    receiving at least one audio/video service;
    receiving an application;
    managing a first table including signaling information indicating that the application is a signaled application authorized for being run on the set-top box;
    receiving a second table including blocking information to block running of the signaled application on the set-top box, the second table being received from a broadcasting Headend;
    blocking running of the signaled application on the set-top box in response to receiving the second table;
    receiving a third table not including the blocking information blocking running of the signaled application on the set-top box, the third table being received from the broadcasting Headend; and
    the third table overriding the second table so that the blocking of the running of the signaled application on the set-top box is removed.

18. A method for blocking a signaled application from being run on a set-top box from a Headend, the method comprising:
    sending at least one audio/video service to the set-top box;
    sending an application to the set-top box;
    sending a first table including signaling information for the application to the set-top box, the signaling information indicating that the application is a signaled application authorized for being run on the set-top box;
    sending a second table including blocking information to the set-top box, the blocking information being for blocking running of the signaled application on the set-top box; and
    sending a third table not including the blocking information blocking running of the signaled application on the set-top box, the third table overriding the second table so that the blocking of the running of the signaled application is removed on the set-top box.

* * * * *

UNITED STATES PATENT AND TRADEMARK OFFICE
CERTIFICATE OF CORRECTION

| | | |
|---|---|---|
| PATENT NO. | : 7,926,075 B2 | Page 1 of 1 |
| APPLICATION NO. | : 11/795214 | |
| DATED | : April 12, 2011 | |
| INVENTOR(S) | : Beaunoir et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 703 days.

Signed and Sealed this
Twenty-ninth Day of January, 2013

David J. Kappos
*Director of the United States Patent and Trademark Office*